US008605654B2

(12) United States Patent
Beaudin et al.

(10) Patent No.: US 8,605,654 B2
(45) Date of Patent: Dec. 10, 2013

(54) APPARATUS, SYSTEM, AND METHOD FOR A REMOTE RADIO MODULE WITH RELAY CAPABILITY

(75) Inventors: Steve Beaudin, Nepean (CA); Carl Peter Conradi, Ottawa (CA)

(73) Assignee: Apple, Inc., Cupertino, CA (US)

( * ) Notice: Subject to any disclaimer, the term of this patent is extended or adjusted under 35 U.S.C. 154(b) by 259 days.

(21) Appl. No.: 12/937,357

(22) PCT Filed: Apr. 21, 2009

(86) PCT No.: PCT/IB2009/005815
§ 371 (c)(1),
(2), (4) Date: Oct. 11, 2010

(87) PCT Pub. No.: WO2010/001205
PCT Pub. Date: Jan. 7, 2010

(65) Prior Publication Data
US 2011/0032879 A1    Feb. 10, 2011

Related U.S. Application Data

(60) Provisional application No. 61/046,645, filed on Apr. 21, 2008.

(51) Int. Cl.
*H04W 4/00* (2009.01)
(52) U.S. Cl.
USPC ........... 370/328; 370/310; 370/329; 370/330; 455/403; 455/447; 455/446
(58) Field of Classification Search
None
See application file for complete search history.

(56) References Cited

U.S. PATENT DOCUMENTS

| 7,283,844 | B2 | 10/2007 | Thompson | |
|---|---|---|---|---|
| 7,349,665 | B1 | 3/2008 | Zhu et al. | |
| 2001/0036843 | A1* | 11/2001 | Thompson | 455/562 |
| 2003/0026363 | A1* | 2/2003 | Stoter et al. | 375/345 |
| 2005/0221755 | A1* | 10/2005 | Falconer et al. | 455/11.1 |

(Continued)

FOREIGN PATENT DOCUMENTS

| WO | WO 03/032524 A1 | 4/2003 |
|---|---|---|
| WO | 2006/115288 A1 | 11/2006 |
| WO | 2007/123733 A2 | 11/2007 |

OTHER PUBLICATIONS

PCT Notification Concerning Transmittal of International Preliminary Report on Patentability, mailed Nov. 4, 2010, International Patent Application No. PCT/IB25009/005815, 9 pages, International Bureau of WIPO.

(Continued)

*Primary Examiner* — Anez Ebrahim
(74) *Attorney, Agent, or Firm* — Meyertons, Hood, Kivlin, Kowert & Goetzel, P.C.; Eric B. Meyertons

(57) ABSTRACT

Provided are an apparatus, system, and method for facilitating wireless communication between a hub and a mobile terminal via a remote radio module. The remote radio module includes a first transceiver operable to wirelessly communicate with the mobile terminal, a second transceiver operable to wirelessly communicate with the hub that is coupled to a core network, and a processor for executing instructions stored in memory. The instructions include instructions for receiving a signal from the hub at a first carrier frequency and processing the signal so that the signal can be retransmitted to the mobile terminal at a second carrier frequency different from the first carrier frequency.

6 Claims, 13 Drawing Sheets

(56) References Cited

U.S. PATENT DOCUMENTS

| | | | |
|---|---|---|---|
| 2006/0246911 A1* | 11/2006 | Petermann | 455/444 |
| 2007/0133477 A1* | 6/2007 | Ebert et al. | 370/335 |
| 2007/0155315 A1* | 7/2007 | Lee et al. | 455/11.1 |
| 2007/0250638 A1* | 10/2007 | Kiran et al. | 709/236 |
| 2008/0002792 A1 | 1/2008 | Shalev | |
| 2008/0063105 A1 | 3/2008 | Gu et al. | |
| 2008/0165789 A1* | 7/2008 | Ansari et al. | 370/401 |

OTHER PUBLICATIONS

PCT International Searching Authority—Authorized Officer Sara Li, PCT Notification of Transmittal of the International Search Report and the Written Opinion of the International Searching Authority, or the Declaration, mailed Jan. 13, 2010, International Patent Application No. PCT/IB25009/005815, 13 pages, Canadian Intellectual Property Office, Gatineau, Quebec.

* cited by examiner

APPARATUS, SYSTEM, AND METHOD FOR A REMOTE RADIO MODULE WITH RELAY CAPABILITY

CROSS REFERENCE

This application is a United States national phase application of co-pending international patent application number PCT/IB2009/005815, filed Apr. 21, 2009, which claims the benefit of U.S. provisional application Ser. No. 61/046,645, filed Apr. 21, 2008, which disclosures are hereby incorporated by reference in their entirety.

BACKGROUND

Wireless communication networks operate by sharing resources among many mobile devices operating in the communication network. Certain types of wireless communication networks are implemented to support cell-based high speed services under certain standards such as the $3^{rd}$ Generation Partnership Project 2 ("3GPP2") Long Term Evolution ("LTE") standard ("3G LTE"), the Ultra-Mobile Broadband ("UMB") broadband wireless standard, and the IEEE 802.16 Broadband Wireless Access standards (often referred to as WiMAX or less commonly as WirelessMAN or Air Interface Standard).

The wireless communication network may provide communication services to a number of areas called "macro-cells" or "cell sites." Within a macro-cell, a base station (BS) or base transceiver station (BTS) is coupled to a gateway or core network via a wired backhaul connection using a modem, and may transmit data to and receive data from mobile terminals that are located within the cell. In order for operators to provide wireless high speed data services, deployment of new cell sites for networks, such as fourth generation (4G) networks, is needed. However, as operators role out 4G networks they are faced with a delicate balancing act. They must invest heavily to role out a new air interface knowing that the initial subscriber density will be very low and their investment will not create significant amounts of revenue for several years. Most operators would typically expect their 4G investment to generate a net loss until a minimum subscriber density is achieved. To minimize the impact, operators would likely choose to role out 4G networks in dense urban centers initially to achieve a critical subscriber density relatively fast, and as these sites become profitable they would extend the coverage to increasingly less populated, less profitable areas. Although such a cautious deployment method makes sense, inter-operator competition for foot print may force operators to be more aggressive, take more risk, and deploy 4G networks aggressively in an effort to gain market share. Given this economic reality, technology which minimizes the business risk by allowing more coverage at a lower initial cost, thereby allowing operators to break even sooner or reduce their exposure, would be extremely attractive to the network operators. Further, the costs of deploying a cell site include capital expenses (e.g., installation, new tower build, equipment, etc.) and operational expenses (e.g., site lease, site maintenance, BTS transmission, etc.). It has been observed that operational expenses have dominated in recent years due to a decrease in capital expenses, especially when the capital expenses are amortized over several years. Two of the major operational expenses which drive the cost of ownership of a wireless site are typically rental fees for the site followed by the back haul cost. Technologies which help reduce the rental fee by simplifying the requirements of the system or which eliminate the cost of backhaul by relaying the backhaul information over the air to a central aggregation point are therefore beneficial to the wireless operator.

Accordingly, what is needed is an improved apparatus, system, and method that minimizes the upfront risks and operating costs associated with deployment of a wireless network.

SUMMARY

In one embodiment, an apparatus comprising a remote radio module is provided. The remote radio module includes a first transceiver operable to wirelessly communicate with the mobile terminal, a second transceiver operable to wirelessly communicate with the hub that is coupled to a core network, and a processor for executing instructions stored in memory. The instructions include instructions for receiving a signal from the hub at a first carrier frequency; and processing the signal so that the signal can be retransmitted to the mobile terminal at a second carrier frequency different from the first carrier frequency.

In another embodiment, a wireless communication system is provided. The system includes a hub coupled to a core network and a plurality of remote radio modules. Each remote radio module includes a first transceiver operable to wirelessly communicate with a mobile terminal, a second transceiver operable to wirelessly communicate with the hub, and a processor for executing instructions stored in memory, the instructions including instructions for receiving a signal from the hub at a first carrier frequency and processing the signal so that the signal can be retransmitted to the mobile device at a second carrier frequency different from the first carrier frequency.

In yet another embodiment, a method for facilitating wireless communication between a hub and a mobile terminal is provided. The method includes providing a remote radio module having a first transceiver operable to wirelessly communicate with a mobile terminal and a second transceiver operable to wirelessly communicate with the hub, receiving a signal from the hub at a first carrier frequency, and processing the signal so that the signal can be retransmitted to the mobile terminal at a second carrier frequency different from the first carrier frequency.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

Aspects of the present disclosure are best understood from the following detailed description when read with the accompanying figures. It is emphasized that, in accordance with the standard practice of the industry, various features are not drawn to scale. In fact, dimensions of the various features may be arbitrarily increased or reduced for clarity of discussion. Following are brief descriptions of exemplary drawings. They are mere exemplary embodiments and the scope of the present disclosure should not be limited thereto.

DETAILED DESCRIPTION

Figure 1:
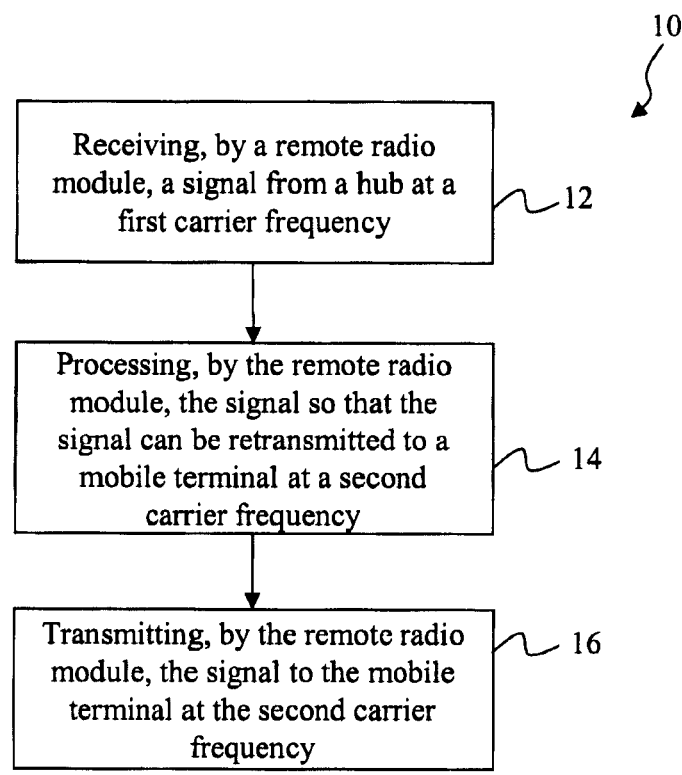
FIG. 1 is a flow chart of an exemplary method for facilitating wireless communications between a hub and a mobile terminal via a remote radio module.

The present disclosure relates generally to communications systems and, more particularly, to wireless communication systems. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, exemplary embodiments of the present invention are described below with reference to WiMAX and/or LTE technologies, both of which employ orthogonal frequency division multiplexing (OFDM) modulation with a time division duplex (TDD) scheme or frequency division duplex (FDD) scheme. It should be noted that the various embodiments disclosed herein are also applicable to other wireless communication technologies currently available, such as CDMA (Code Division Multiple Access), UMTS (Universal Mobile Telecommunications System), GSM (Global System for Mobile communication), or future developed that employ relay node technology.

Referring to FIG. 1, in one embodiment, a method 10 is implemented for facilitating wireless communication between a mobile terminal and a hub via a remote radio module. As will be described later in greater detail, the hub provides high speed data services to the mobile terminal via the remote radio module in a wireless network. Communications from the hub to the mobile terminal occur in a downlink, and communications from the mobile terminal to the hub occur in an uplink. The method 10 begins with block 12 in which the remote radio module receives a signal from the hub at a first carrier frequency. The remote radio module provides coverage in an area where the mobile terminal is located. In one embodiment, the signal may include an OFDM modulated signal sent at a first carrier frequency (e.g., 3.5 GHz for backhaul connection). It is understood that OFDM technology as specified by wireless technology standards such as WiMAX and 3G LTE are well defined, and thus are only described briefly herein. OFDM technology utilizes a channelized approach and divides a communication channel into many sub-channels (or sub-carriers) with each sub-carrier being orthogonal to the other sub-carriers. The number of sub-carriers depends on a bandwidth of the carrier signal, such as 5 MHz (512 sub-carriers), 10 MHz (1024 sub-carriers), or 20 MHz (2048 sub-carriers). Other modulation schemes available to those skilled in the art are also applicable to the present disclosure.

The method 10 continues with block 14 in which the remote radio module processes the signal so that the signal can be retransmitted to the mobile terminal at a second carrier frequency different from the first carrier frequency. The remote radio module performs baseband processing to allow the received signal to be adequately filtered before being retransmitted at a different carrier frequency. In some scenarios, the remote radio module may receive the desired signal along with an adjacent interferer signal which may be stronger than the desired signal. Adequate filtering filters out the unwanted interferer signal so that the interferer signal is not retransmitted at a very high power. Additionally, the frequency may be shifted so that the filtered and delayed signal can be transmitted at the different frequency. The method 10 continues with block 16 in which the remote radio module transmits the signal to the mobile terminal at the second carrier frequency (e.g., 2.5 GHz for access connection). Although the method 10 has been described with reference to communications in the downlink (from the hub to the mobile terminal), it is understood that the method 10 may implemented for communications on the uplink (from the mobile terminal to the hub) in a similar manner. Further, as will be described later in greater detail, an adaptive gain function may be performed on the uplink signal that is received by the remote radio module so that the signal can be retransmitted at a power close to a power rating of the transmitter of the remote radio module.

The power control algorithm between the mobile terminal and the base station is an important aspect of a wireless network. The uplink power control is critical to system performance given that a multitude of terminals are transmitting back to the base station simultaneously. The terminals are scattered throughout the cell and those terminals on the cell edge are reaching the base station at a much lower power than terminals which are close in to the base station. Given that the base station receiver has a limited dynamic range, it is important to limit the spread in power levels between the far-out and close-in terminals.

For a typical 3G or 4G wireless system there is a power control algorithm which provides closed loop control of the uplink power arriving from the terminals. The base station will try to maintain incoming uplink signals at a target power spectral density or at least within an acceptable range. As the path loss for an individual terminal increases or decreases, the base station informs the terminal that the power has increased or decreased through some form of a control channel and the terminal reacts accordingly to bring its power back towards the desired power at the base station receiver. Depending on the standard in question, CDMA, UMTS, GMS, WiMax, or LTE the implementation of the control channel and the update rate may vary. As with any closed loop control system, the amount of feedback to provide and the response time or update rate of the control loop are two key parameters which determine the performance and stability of the loop.

The downlink power control within a cell tends to be slightly less critical that the uplink power control. The primary reason for this is that there is no near-far scenario on the downlink since all terminals are receiving from a common base station transmitter. Nevertheless, downlink power requirements can vary as users move into or out of the cell, and as more capacity is used on the carrier or carriers. The downlink power requirement can also increase or decrease during a handoff.

With the macro-relay node implementation discussed in the present disclosure, a node between the base station and terminal has been inserted. From a power control perspective, there are two options for power control. On option is to keep both the Uplink gain (e.g., Gul(t)) and Downlink gain (e.g., Gdl(t)) of the macro-relay fixed. By maintaining the gain fixed, the presence of the macro-relay would be largely transparent to the power control algorithms of the standard being used. If one chooses to maintain the gains fixed, it is critical that a signal entering the receive port at an elevated power not cause the transmitters to go into compression as a result of the fixed amount of gain in the system. As such, some gain adjustment may be necessary.

If one provides gain adjustment, there are two additional options. The first is to adjust the gain during the initial commissioning and periodically during fine tuning of the network. For a typical wireless antenna with a peak gain of 18 dB, with a 3 dB vertical beam width of 7 degrees, at a height of 30 m above the ground, the (line of sight path loss–antenna gain) will vary from 118 dB to 92 dB. The 118 dB is achieved at the cell edge for a 4 km radius. The 92 dB is achieved close in to the node at a horizontal distance of 64 meters from the antenna. Assuming that a closed loop power control were operating between the macro-cell and the terminals, the algorithm would cause the close-in terminal to drop its transmit power down to maintain a target power with respect to the macro-cell. Furthermore, the same algorithm would request that the terminal at the cell edge increases its transmit power to try to maintain the desired signal strength at the macro cell. In an analysis which was performed, it was observed that the terminal 4 km out would have increased its power to the maximum of about 23 dBm while the terminal at the cell edge would have decreased its power to –1.9 dBm. By reducing the close-in power by 24.9 dB compared to the far-out terminal, the power control algorithm has nearly completely eliminated the power spread introduced by the differences in path loss. In such a scenario, an algorithm would only be needed to fine tune the gain in the macro-relay during initialization and periodically as one encounters traffic patterns which dictate more or less gain, and data is collected which enables the system to gauge the maximum signal strength that is likely to enter the macro relay receiver. Clearly, more gain can be beneficial from a link budget perspective so long as we do not overdrive the receivers at the hub, or cause the transmitter in the macro-relay to go into compression.

Figure 2:
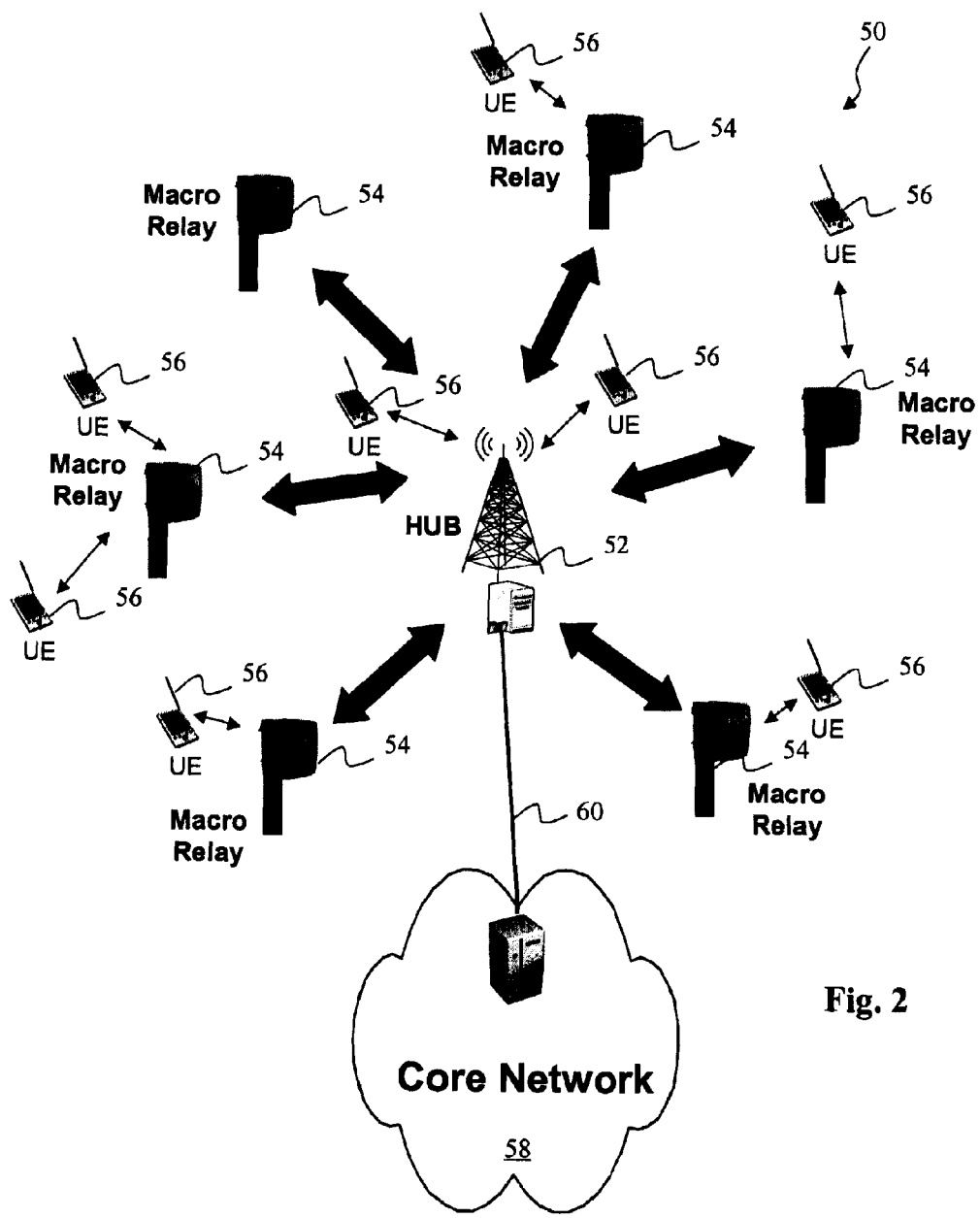
FIG. 2 is a diagram of an exemplary wireless communication network within which the method of FIG. 1 may be practiced.

Referring now to FIG. 2, a wireless communication network 50 illustrates an exemplary system in which the method 10 described with reference to FIG. 1 may be practiced. In the present example, the network 50 is a wireless network that supports high speed data services in accordance with wireless technology standards, such as WiMAX and LTE. The network 50 may be deployed in a hub and spoke configuration. The network 50 includes a base station (BS) 52, a plurality of remote radio modules 54, and a plurality of user equipment (UE) 56 (or mobile terminals or mobile devices). Although the network 50 is illustrated with one base station, it is understood that any number of base stations may be implemented to provide coverage for a given area.

The BS 52 is a type of device that is known in the art, and thus not described in detail herein. In the present embodiment, the BS 52 functions as a hub that services the remote radio modules 54 as well as the UE 56 that are in sufficient proximity to itself. The BS 52 is connected to a gateway or a core network 58 (e.g., Internet or other suitable network) via a wired backhaul connection 60. For example, the BS 52 includes a modem with a 100Base-T Ethernet connection to the core network 58. The BS 52 may include suitable hardware and software components for supporting wireless communication with the remote radio modules 54 and UE 56 in accordance with wireless technology standards, such as WiMAX and LTE. For example, the BS 52 may include a processor, transmitter, receiver, antenna, volatile and non-volatile memory, input/output device, and other suitable devices. As previously noted, the BS 52 supports wireless communications that include OFDM carriers consisting of multiple tones separated in frequency, each of which carries information (e.g., data, voice, and control information). It should be noted that the modem at the BS 52 services the BS 52 and the remote radio modules 54. Accordingly, the modem is able to realize that the UE 56 within proximity of one of the remote radio modules 54 is further out because of the larger propagation delay and may adjusts for the delay. The modem will treat all these locations of the remote radio modules 54 as different carriers of different sectors, and will do handoff based on typically handoff criteria such as signal strength or signal quality as is known in the art.

The remote radio modules 54 function as macro-relays that extend coverage of the BS 52. Each of the remote radio modules 54 includes an over the air backhaul connection to the BS 52 (e.g., macro-cell to macro-relay). Also, each remote radio module 54 provides an over the air access connection to the UE 56 that are in sufficient proximity to itself (or within its coverage area). As will be described later in greater detail, the remote radio modules 54 include suitable hardware and software components that facilitate wireless communications between the BS 52 and their respective UE 56. It should be noted that the remote radio modules 54 are not required to have a wired backhaul connection as was provided in the BS 52. Accordingly, the remote radio modules can be deployed on any elevated structure where there is power (e.g., utility pole, building, power distribution tower, etc.). Further, the operational expenses of deploying remote radio modules as macro-relay nodes are lower than operational expenses of deploying full access point cell sites such as the BS.

The UE 56 can be various mobile terminals or mobile devices known in the art or future developed. For example, the UE 56 may include laptops with wireless functionality, cell phones, wireless data terminals, personal data assistant (PDA), and the like. The UE 56 may also include suitable hardware and software components that support wireless communications with the BS 52 and the remote radio modules 54. For example, the UE 56 may include a baseband processor, transceiver, antenna, and a user interface. In the present embodiment, the UE support wireless communication using OFDM carriers.

Figure 3:
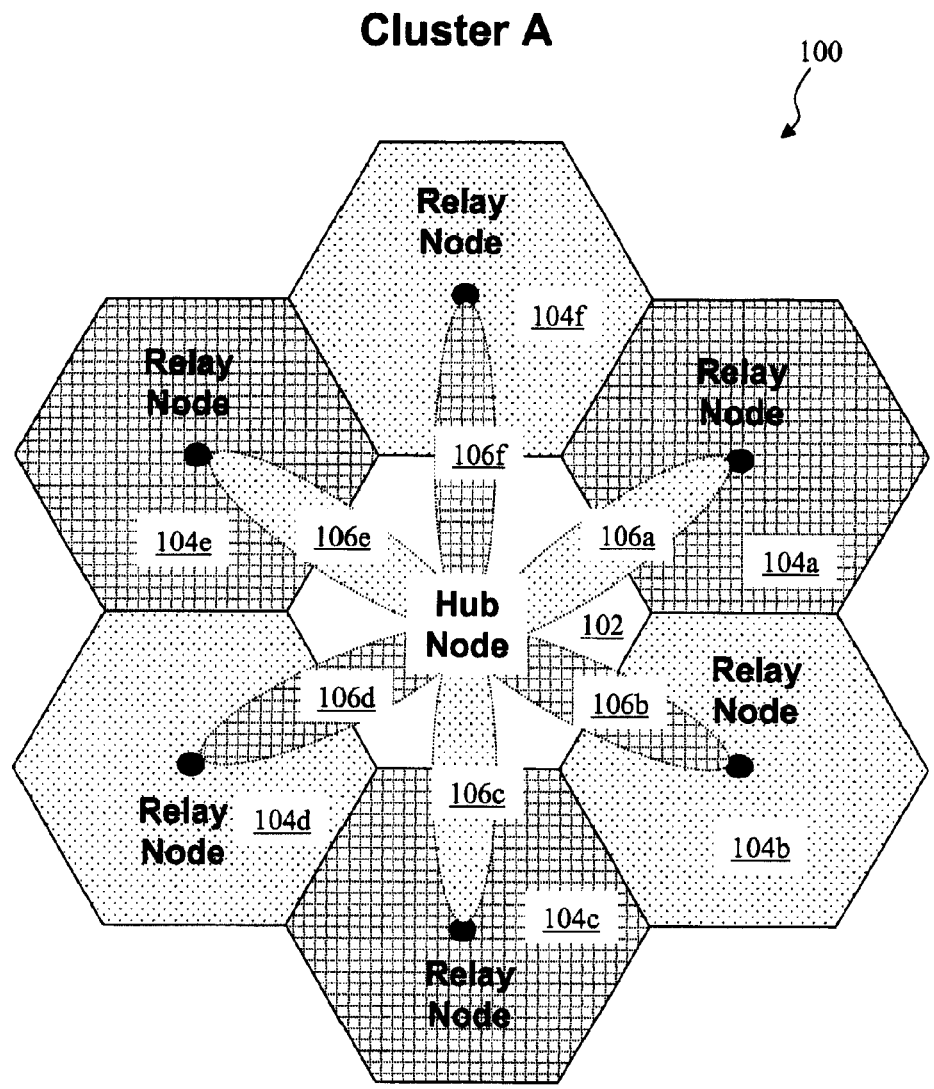
FIGS. 3 to 5 are diagrams of exemplary cluster configurations that may be deployed within a wireless communication network.
Figure 4:
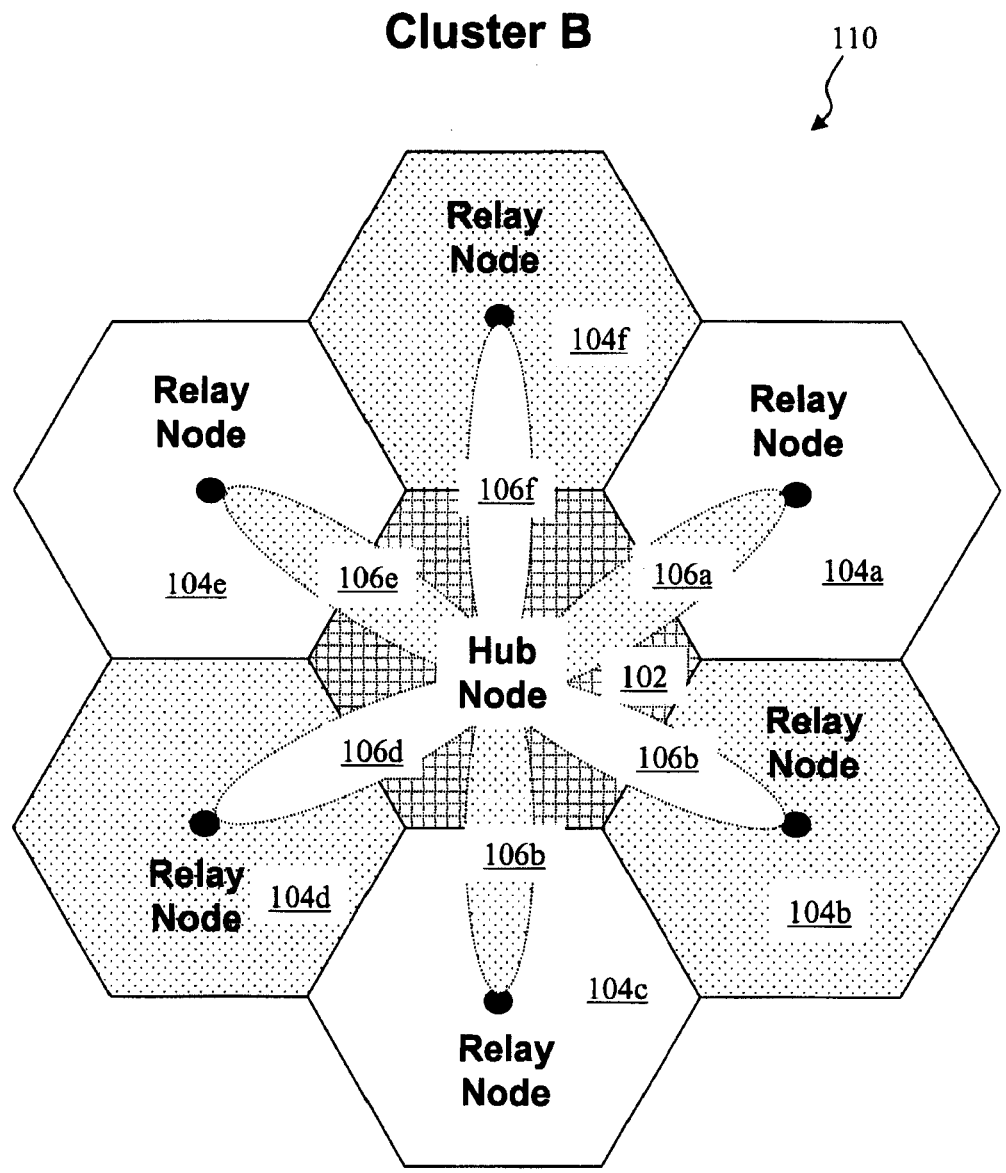
Figure 5:
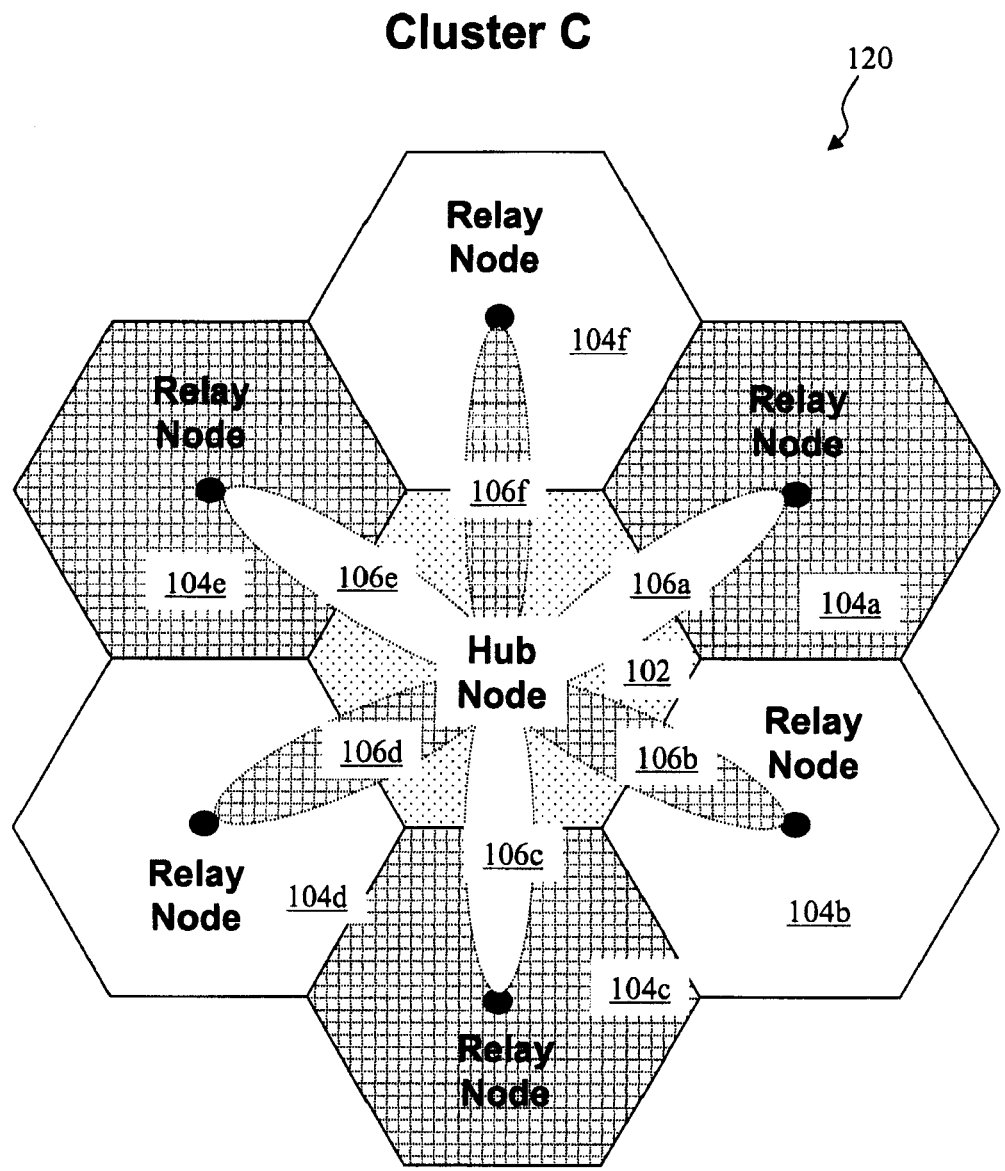

Referring now to FIGS. 3 to 5, illustrated are exemplary cluster configurations that may be deployed in a wireless communication network, such as the network 50 of FIG. 2. The various cluster formations disclosed below may be deployed using an N=3 frequency reuse plan. It is understood the other frequency reuse plans may be implemented as well. The n=3 frequency reuse plan specifies that three different frequencies (e.g., frequency1, frequency2, and frequency3) are used to deploy the wireless network. In FIG. 3, cluster A 100 includes a hub node 102 and a plurality of relay nodes 104a-f. The hub node 102 may be configured as the BS 52 of FIG. 2, and the relay nodes 104a-f may be configured as the remote radio modules 54 of FIG. 2. The hub node 102 provides coverage to a respective cell, and each relay node 104a-f provides coverage to its respective cell. The hub node 102 provides an access connection to mobile terminals or subscribers within its coverage cell area at frequency1. For relay nodes 104a, 104c, and 104e, a backhaul connection 106a, 106c, and 106e, respectively, to the hub node 102 is provided at frequency2, and an access connection to mobile terminals or subscribers within the respective coverage cell area is provided at frequency3. For relay nodes 104b, 104d, and 104f, a backhaul connection 106b, 106d, and 106f, respectively, to the hub node 102 is provided at frequency3, and an access connection to mobile terminals or subscribers within the respective coverage cell area is provided at frequency2. It has been observed that the N=3 frequency reuse plan works well because no two adjacent cells are using the same frequency for access. For the backhaul connection (between the hub node and the relay nodes) the antennas are sufficiently directional such that relatively little energy will spill over to another cell. For example, directional antennas for backhaul appear to be able to provide 40 dB sidelobe suppression at 120 degrees. Accordingly, one can reuse frequencies at 120 degrees increments.

In FIG. 4, cluster B 110 is similar to cluster A 100 of FIG. 3 except that the frequencies are distributed in a different manner. Accordingly, similar features in FIGS. 3 and 4 are numbered the same for the sake of clarity. Cluster B 110 includes a hub node 102 and a plurality of relay nodes 104a-f. The hub node 102 may be configured as the BS 52 of FIG. 2 and the relay nodes 104a-f may be configured as the remote radio modules 54 of FIG. 2. The hub node 102 provides coverage to a respective cell, and each relay node 104a-f provides coverage to its respective cell. The hub node 102 provides an access connection to mobile terminals or subscribers within its coverage cell area at frequency3. For relay nodes 104a, 104c, and 104e, a backhaul connection 106a, 106c, and 106e, respectively, to the hub node 102 is provided at frequency2, and an access connection to mobile terminals or subscribers within the respective coverage cell area is provided at frequency1. For relay nodes 104b, 104d, and 104f, a backhaul connection 106b, 106d, and 106f, respectively, to the hub node 102 is provided at frequency1, and an access connection to mobile terminals or subscribers within the respective coverage cell area is provided at frequency2. It has been observed that the N=3 frequency reuse plan works quite well because no two adjacent cells are using the same frequency for access. For the backhaul connection (between hub node and relay nodes) the antennas are sufficiently directional such that relatively little energy will spill over to another cell.

In FIG. 5, cluster C 120 is similar to cluster A 100 of FIG. 3 except that the frequencies are distributed in a different manner. Accordingly, similar features in FIGS. 3 and 5 are numbered the same for the sake of clarity. Cluster C 120 includes a hub node 102 and a plurality of relay nodes 104a-f. The hub node 102 may be configured as the BS 52 of FIG. 2 and the relay nodes 104a-f may be configured as the remote radio modules 54 of FIG. 2. The hub node 102 provides coverage to a respective cell, and each relay node 104a-f provides coverage to its respective cell. The hub node 102 provides an access connection to mobile terminals or subscribers within its coverage cell area at frequency2. For relay nodes 104a, 104c, and 104e, a backhaul connection 106a, 106c, and 106e, respectively, to the hub node 102 is provided at frequency1, and an access connection to mobile terminals or subscribers within the respective coverage cell area is provided at frequency3. For relay nodes 104b, 104d, and 104f, a backhaul connection 106b, 106d, and 106f, respectively, to the hub node 102 is provided at frequency3, and an access connection to mobile terminals or subscribers within the respective coverage cell area is provided at frequency1. It has been observed that the N=3 frequency reuse plan works quite well because no two adjacent cells are using the same frequency for access. For the backhaul connection (between hub node and relay nodes) the antennas are sufficiently directional such that relatively little energy will spill over to another cell.

Figure 6:
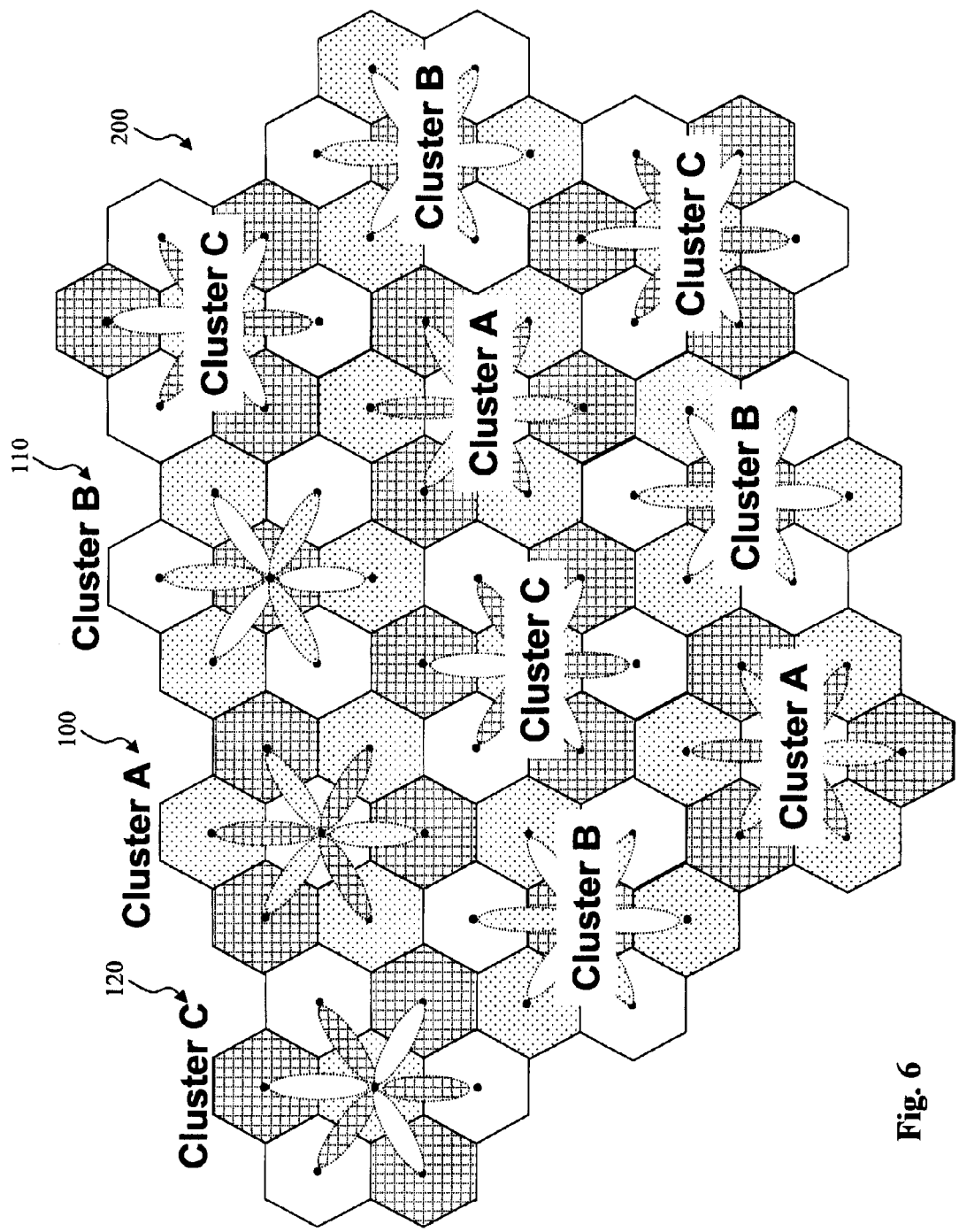
FIG. 6 is a diagram of an exemplary extended wireless communication network implementing the cluster configurations of FIGS. 3 to 5.

Referring now to FIG. 6, illustrated is an exemplary extended wireless communication network 200 that implements the cluster configurations 100, 110, and 120 of FIGS. 3, 4, and 5, respectively. As shown, as long as one inverts the clusters (e.g., cluster A, cluster B, cluster C) there will not be situations where two adjacent cells are using the same frequency for access. For the backhaul connection (between hub node and relay nodes) the antennas are sufficiently directional such that relatively little energy will spill over to another cell. Accordingly, the N=3 frequency reuse plan as described in FIGS. 3 to 5 can easily be expandable to cover any region with minimal interference.

Figure 7:
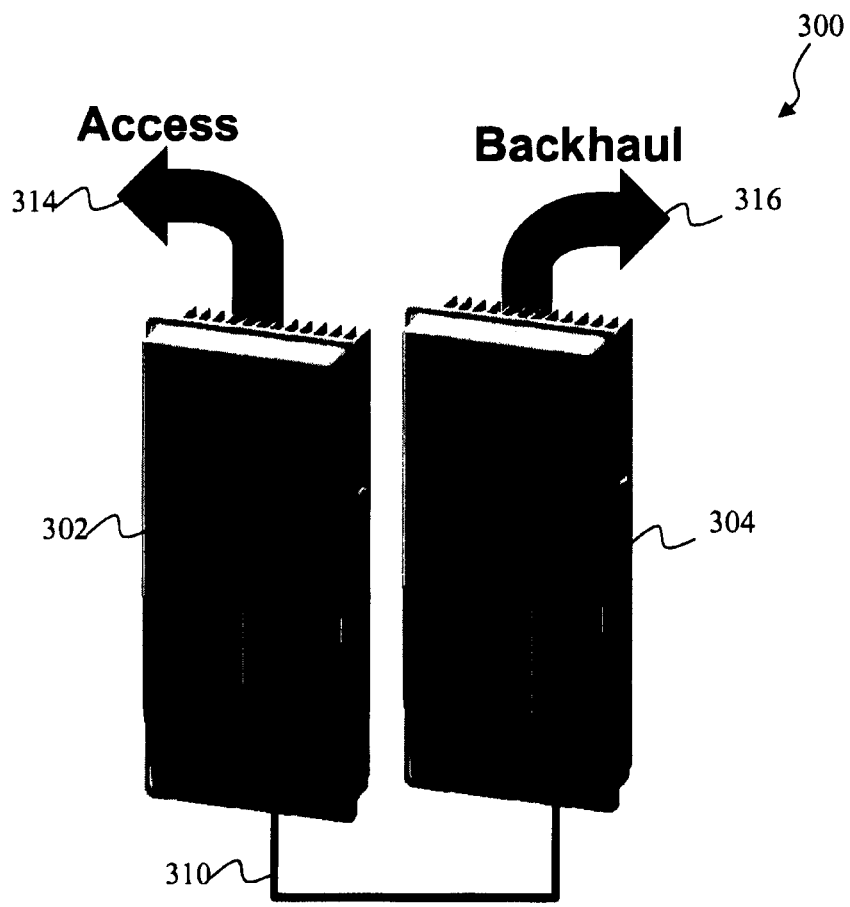
FIG. 7 is a schematic of an exemplary remote radio module employing two radio units.

Referring now to FIG. 7, illustrated is an exemplary remote radio module 300 having two radio units. The remote radio module 300 comprises two radio units 302 and 304 that have an external data connection 310 between them. The radio unit 302 provides an access connection 312 to mobile terminals within the coverage area of the remote radio module 300. The radio unit 304 provides a backhaul connection to a hub such as the BS 52 of FIG. 1. It has been observed that two radio units provides flexibility since the access 312 and the backhaul 314 connections can be provided at different frequency bands if desired, or the access 312 and the backhaul 314 connections can be provided in the same frequency band if desired. Typically for a 4G deployment such as LTE or WiMAX deployment, a baseline for each radio unit 302, 304 is two transmitters and two receivers per sector or cell. Accordingly, the two transmitters are able to perform 2×2 MIMO (multiple input multiple output) on the downlink per sector or cell. The two receivers are for receive diversity.

Figure 8:
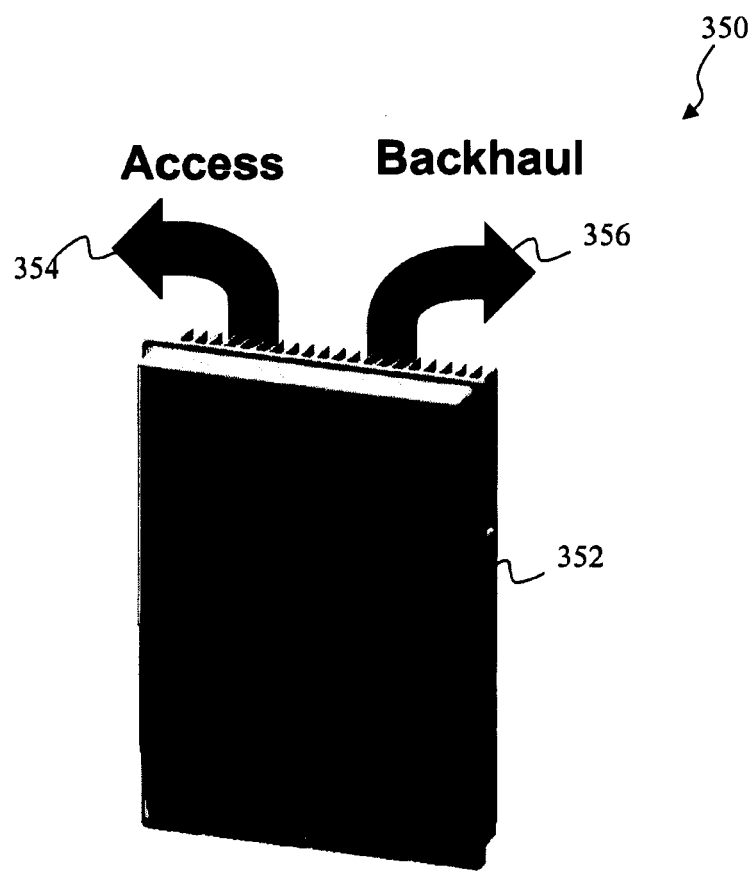
FIG. 8 is a schematic of an exemplary remote radio module employing one radio unit.

Referring now to FIG. 8, illustrated is an exemplary remote radio module 350 having a single radio unit. The remote radio module 350 comprises one radio unit 352 that includes four transmitters and four receivers. When the remote radio module 350 functions as a macro-relay node, two of the four transmitters and two of the four receivers are used for access 354 at one frequency, and the other two of the four transmitters and the other two of the four receivers are used for backhaul 356 at a different frequency. When one desires to upgrade the remote radio module 350 to a full access point where the remote radio module is connected to a modem (e.g., BS 52 of FIG. 1), the radio unit 352 functions as a full four branch radio which has four transmitters and four receivers.

Figure 9:
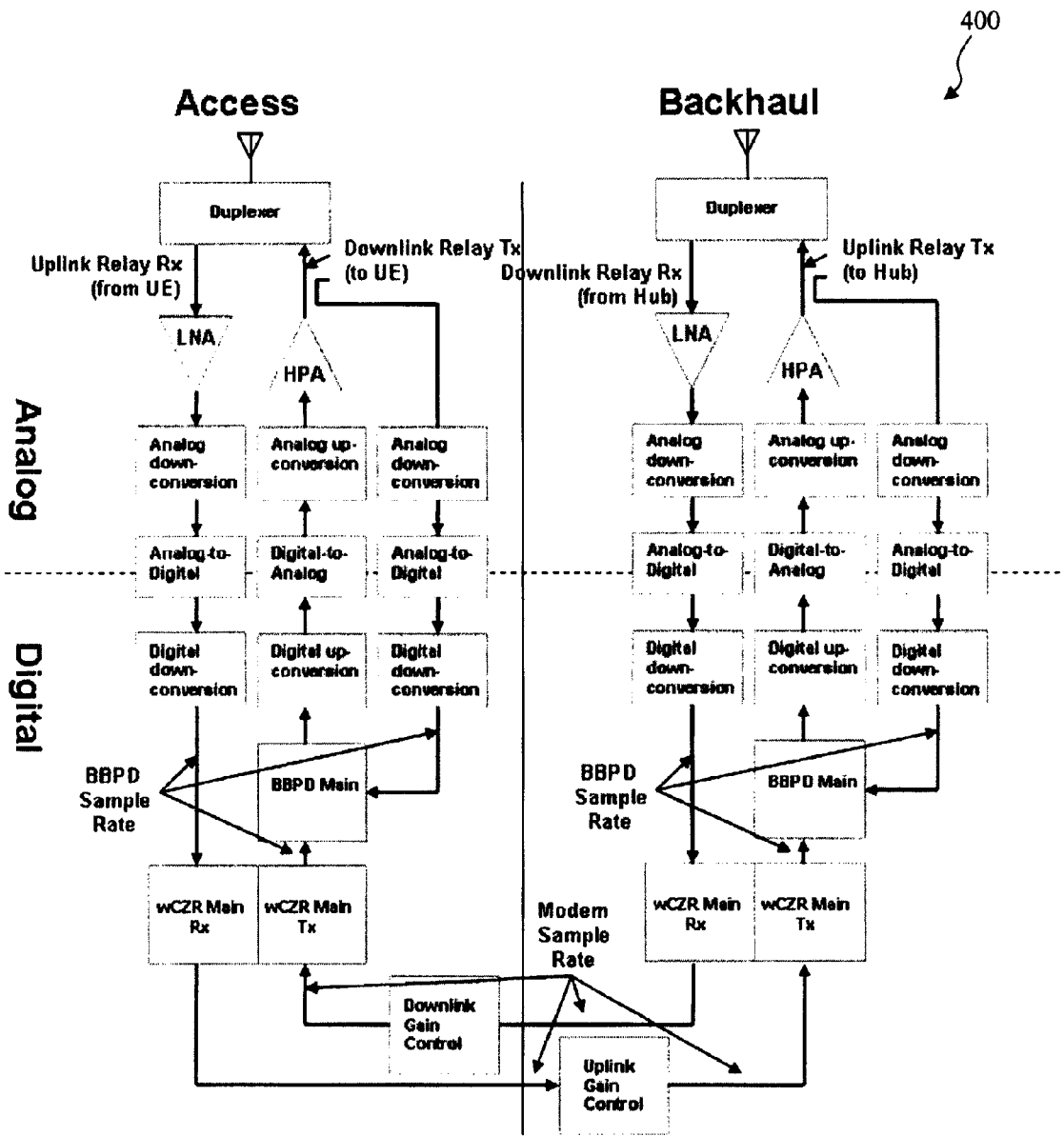
FIG. 9 is a block diagram of an exemplary remote radio module according to various aspects of the present disclosure.

Referring now to FIG. 9, illustrated is a high-level block diagram of an exemplary remote radio module 400 when configured to act as a macro-relay node. The remote radio module 400 includes one transceiver for a backhaul connection to a hub (such as the BS 52 of FIG. 2), and another transceiver to provide access to mobile terminals or subscribers. The backhaul transceiver includes one transmitter and one receiver. The access transceiver also includes one transmitter and one receiver. It is understood that the remote radio module 400 includes various components such as filters, mixers, duplexers, multiplexers, digital signal processors, microprocessor, memory, and other suitable components that perform the functions described below. The signal received at one frequency undergoes baseband processing to allow the signal to be adequately filtered before the signal is retransmitted at another frequency.

For a downlink signal (from the hub to the mobile terminal/user equipment), the signal is received at an antenna and filtered by a duplexer and passed to a receive path. In the receive path, the signal is amplified by a low noise amplifier (LNA). The amplified analog signal may then be down-converted from RF to an intermediate frequency (IF) or directly to baseband. Alternatively, this stage can be omitted if the analog-to-digital converter is fast enough to sample an RF signal directly. The RF, IF, or baseband signal is then digitally sampled and converted from an analog signal to a digital signal. The signal at the output of the digital-to-analog converter may be down-converted to baseband if the analog signal was sampled at IF or RF with a digital demodulator. The signal is then re-sampled and filtered to a modem sample rate through a receive channelizer (Rx wCZR). The signal may undergo a downlink gain control algorithm. The signal is then re-sampled and filtered from the modem sample rate to a sample rate used by the base-band pre-distortorer (BBPD) through a transmit channelizer (Tx wCZR). The signal is linearized through a BBPD block by sampling from a signal at an output of a high power amplifier (HPA). The output of BBPD block may be up-converted to an intermediate or RF frequency before it is converted from a digital domain to an analog domain. The analog signal may be baseband, IF, or RF depending on the up-conversion technique. In one embodiment, the RF signal is passed through the HPA whose output is sampled and fed back to the BBPD block to generate a pre-distortion signal. The output at the HPA is passed to a duplexer. The output of the duplexer is passed to an antenna for transmitting the signal to the mobile terminal.

For an uplink signal (from the mobile terminal/user equipment to the hub), the same flow occurs but just in the reverse direction as the downlink signal described above. As will be explained later in greater detail, the uplink gain control and/or the downlink gain control may include an adaptive digital gain block that seeks to maintain peaks of digital power into the transmitters.

To configure the relay node to operate in a 2×2 MIMO configuration, the remote radio module may include four antennas instead of two antennas, and the hardware may include twice the components as illustrated in FIG. 9. For example, the radio unit 352 of FIG. 8 includes four transmitters and four receivers in a signal unit. Alternatively, a relay node operating in a 2×2 MIMO configuration on the downlink may employ two radio units where each radio unit (such as radio units 302 and 304 of FIG. 7) is represented by the remote radio module 400. For some standards, the transmitter may be synchronized to other transmitters in the wireless network, and in such a case the remote radio module when acting as a macro-relay node needs to extract timing and frequency information from the downlink signal. It should be noted that the remote radio module effectively filters and shifts the frequency of the signal received either from the hub or mobile terminal, and retransmits the same signal at a different frequency. Accordingly, the remote radio module doest not actually remodulate and repackage the modulated signal that is received.

It has been observed that the amount of adjacent channel filtering required within both transmit and receive channelizers is dependent on the relevant signal powers between the desired in-band signal and an interferer in an adjacent channel, the desired degree of stability margin, and the emissions mask that needs to be met on the output of the transmit chain. The stability margin is the factor by which isolation between Tx and Rx paths exceed active gain for unconditional stability. In some embodiments, the remote radio module implements 100 dB digital filtering within the channelizers.

Figure 10:
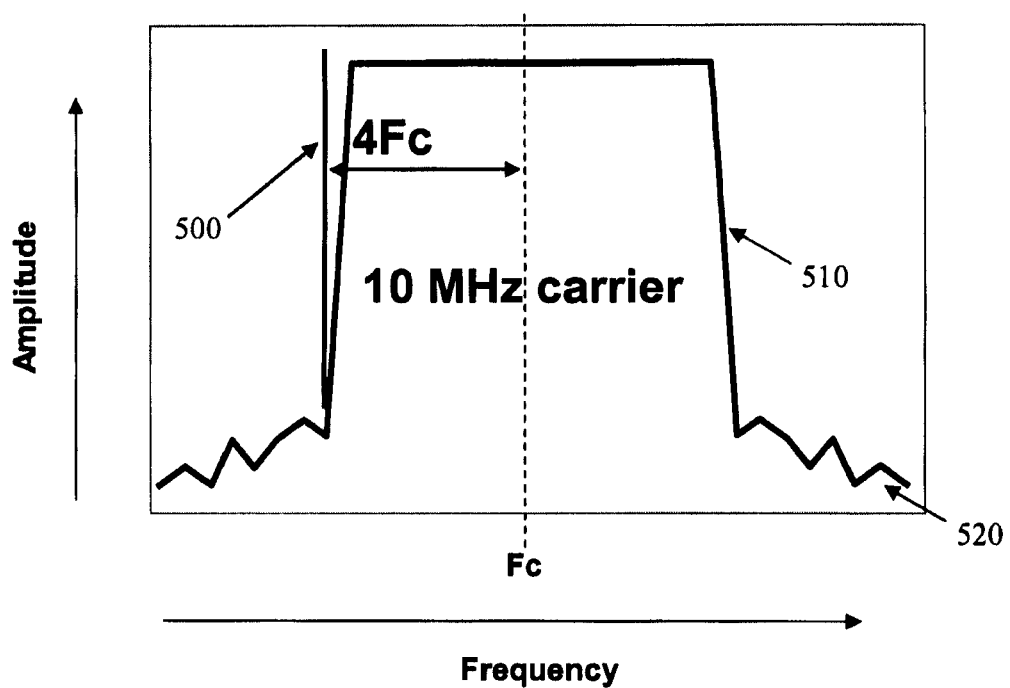
FIG. 10 is a graphical representation of an exemplary control channel that may be implemented between a hub and a remote radio module.
Figure 11:
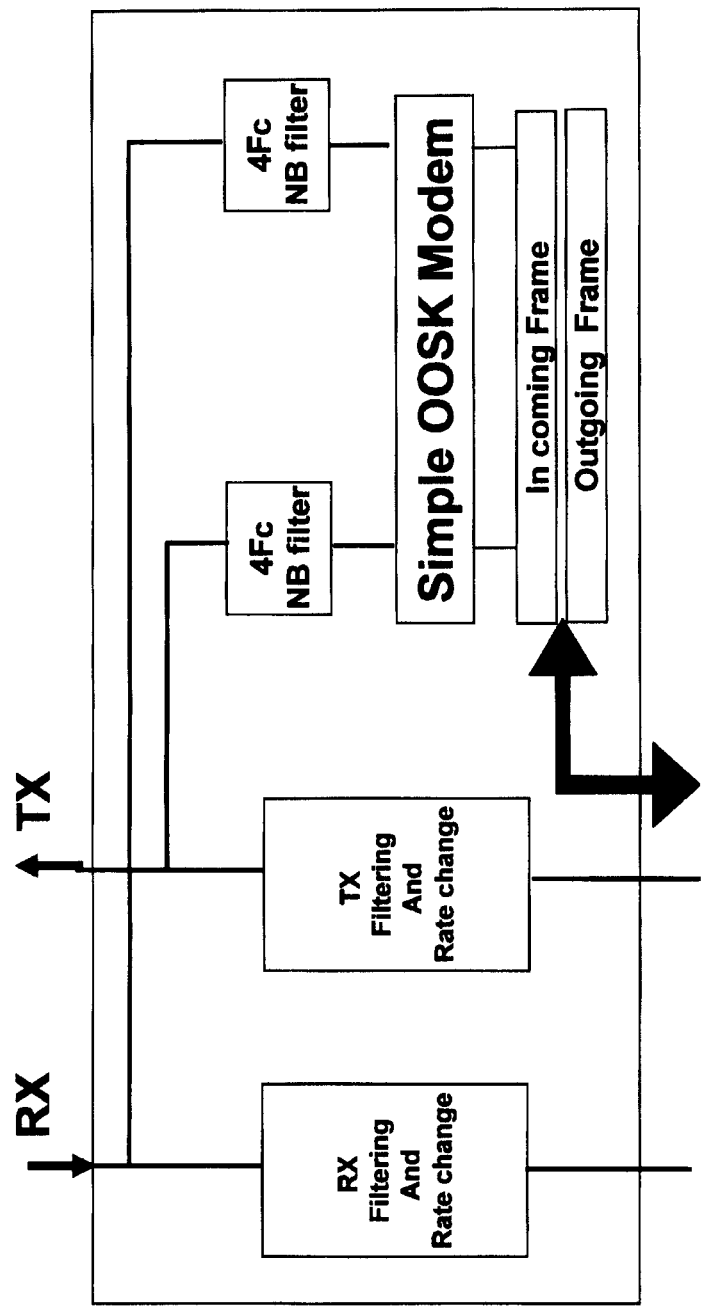
FIG. 11 is a block diagram of an exemplary carrier generator for generating the control channel of FIG. 10.

Referring now to FIG. 10, illustrated is graphical representation of an exemplary control channel that may be implemented between a hub and a remote radio module. The control channel passes along control information (or non-traffic data) and allows one to configure hardware, receive alarm messages from the hardware, send alarm messages to the hardware, or other suitable purposes. The control channel may be referred to as an Operational, Alarm, and Monitor (OA&M channel). In the present embodiment, the control channel 500 may be implemented in a transition band of a carrier signal 510. One example of a carrier generator is illustrate in FIG. 11. The carrier generator implements a simple OOSK (on/off shift keying) modem in the digital section of the remote radio module to generate the control channel in the transition band of the carrier signal.

The control channel 500 is compatible and transparent to wireless standards such as LTE or WiMAX. The carrier signal 510 includes a frequency Fc (e.g., 2.5 GHz, 3.5 GHz, or other suitable carrier frequency) with a frequency band of 10 MHz (e.g., 10 MHz carrier), and out of channel noise 520 generated by the transmitter. A radio channelizer can place a modulated data tone 500 in the transition band of the carrier signal 510 such that tone is within the owned spectrum of the operator and does not violate FCC or ETSI standards. That is, if the operator owns 10 MHz spectrum, the actual bandwidth of the data-bearing signal is typically 9 MHz. Accordingly, there is about 0.5 MHz on either side which is dedicated for a transition band, and not actually used for data communication. For example, the control channel may be placed with an offset of 4 Fc for a 10 MHz frequency band carrier or an offset of 2 Fc for a 5 MHz frequency band carrier. Thus, a proprietary modulated OA&M tone may be placed in that transition band on either side of the carrier signal 510. The OA&M tone may include a conventional modulated carrier that is available to one skilled in the art. The OA&M tone may be a couple of hundred KHz wide so long as it fits within the frequency band that is available to the operator. The modem at the hub would basically ignore the control channel in the transition band because the modem sees it as an interferer signal. Accordingly, there is no problem as long as the amplitude of the control channel is not strong enough to harm or hinder the ability of the modem to demodulate the desired signal or the mobile terminal to demodulate the desired signal. In other embodiments, the control channel may be transmitted at the DC frequency such as a baseband DC which turns out to be the LO frequency for zero IF type transmitter Alternatively, for some standards such as WiMAX or LTE, one or several of the OFDM sub-carriers may be reserved for non-traffic data, or may be dedicated for an OA&M control channel. The number of sub-carriers transmitted depends on the carrier bandwidth (frequency band). Typically not all sub-carriers are used to carry information, the standards allow some of the bands on the edge of the carrier to be vacant basically as guard bands. The modem at the hub may declare that some of the tones are not going to used but reserved for a different purpose such as power applications. For example, the modem may declare a tone to be reserved for peak to average power ratio (PAPR). Accordingly, one of those reserved tones or several of them may be used to transmit a proprietary OA&M channel over the air between the remote radio module (macro-relay node) and the hub (macro-cell). A simple protocol such as TCPIP protocol may be used for the reserved tone.

During the initialization of the remote radio module, there would be a search algorithm where the relay node search for one of these control channels that are coming from the hub as is known in the art. Once the control channel is found, the remote radio module may download its configuration information before the radio starts to transmits data to the hub or mobile terminal.

Figure 12:
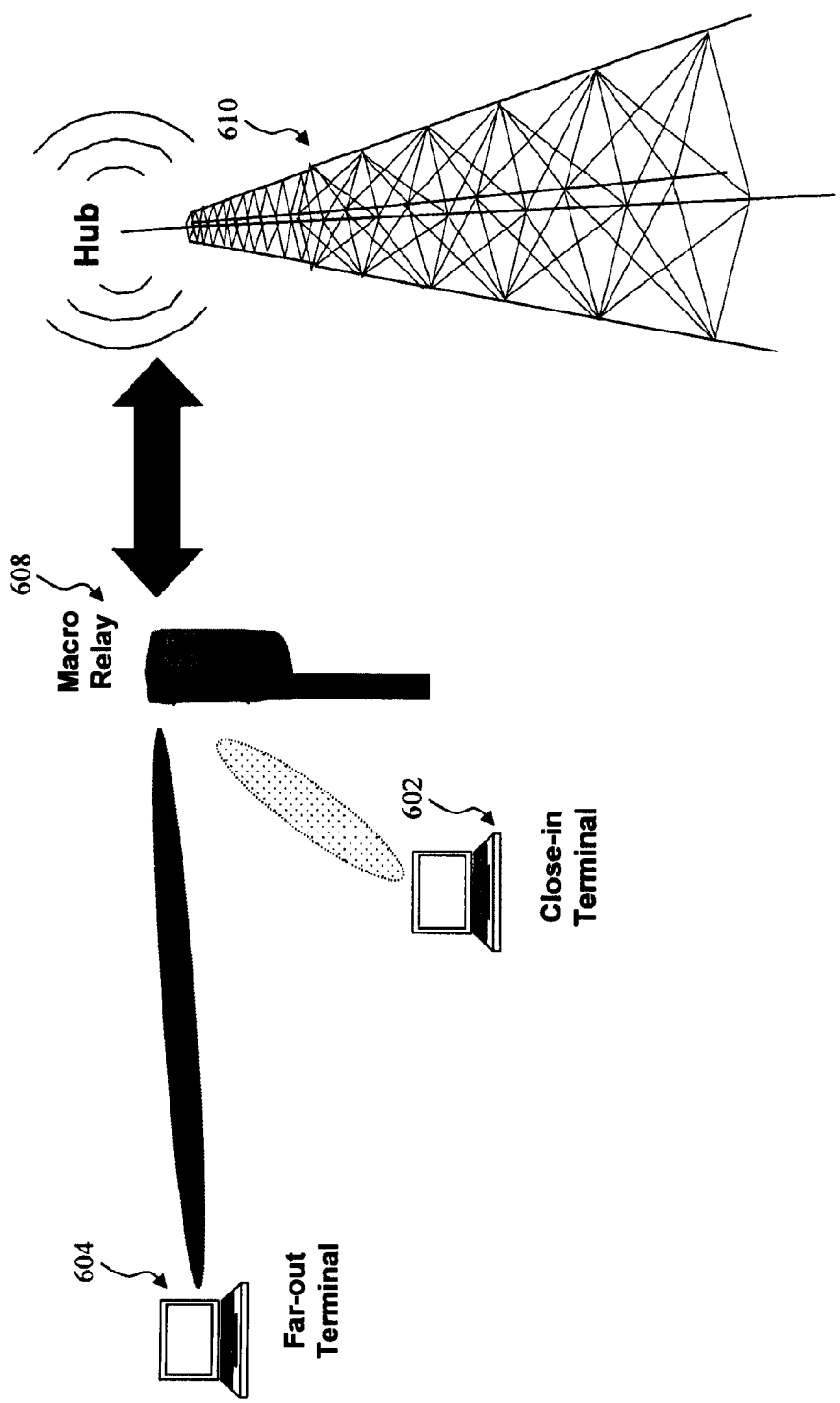
FIG. 12 is a diagram of a close mobile terminal and a far mobile terminal communication with a remote radio module, and the remote radio module communicating with a hub.
Figure 13:
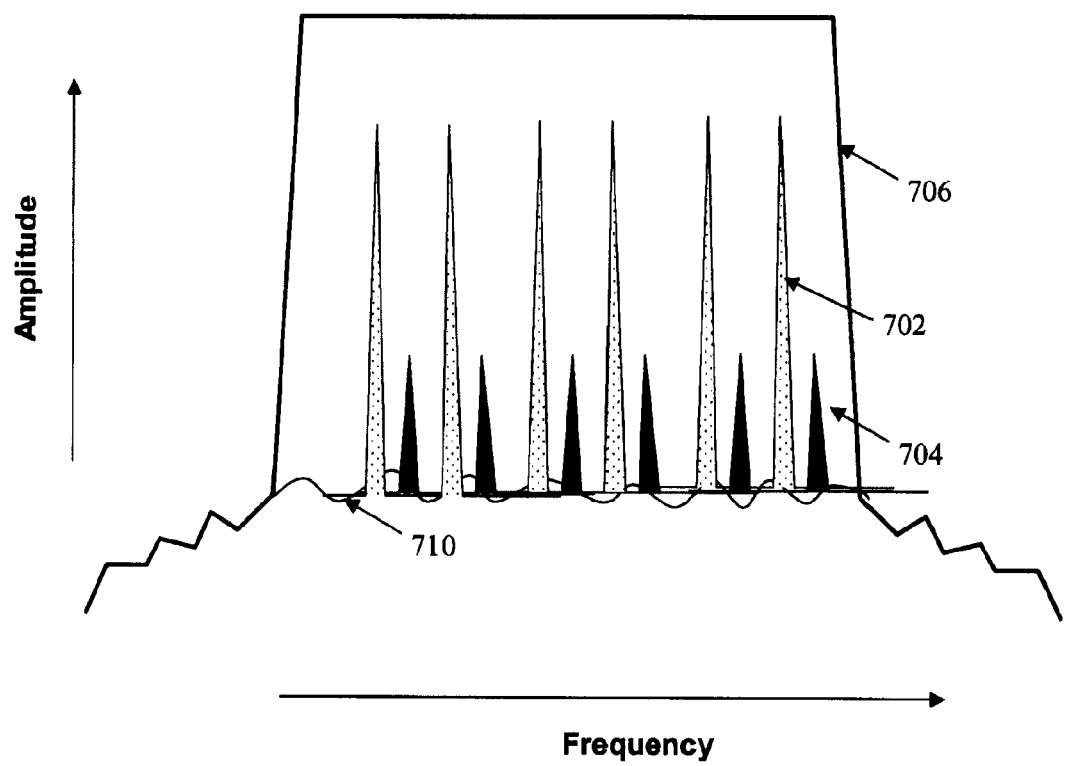
FIG. 13 is a graphical representation of communication signals transmitted between the mobile terminals, remote radio module, and the hub of FIG. 12.

Referring now to FIG. 12, illustrated is a scenario where a close mobile terminal and a far mobile terminal are communicating with a remote radio module, and the remote radio module is communicating with a hub. The close mobile terminal 602 (mobile terminal 1) and far mobile terminal 604 may be similar to the UE 56 of FIG. 2. The mobile terminals 602, 604 wireless communicate with a macro relay 608 such as the remote radio module 54 of FIG. 2. The macro-relay 608 in turn processes the signals and retransmits the same signal to a hub 610 at a different frequency. In the present example, the mobile terminal 602 is in closer proximity to the macro relay 608 than the mobile terminal 604. Referring now also to FIG. 13, illustrated is a graphical representation of communications signals that may be transmitted in the scenario of FIG. 12. The representation shows a signal 702 transmitted by the close mobile terminal 602 to the relay 608, a signal 704 transmitted by a far mobile terminal 604 to the relay 608, and a signal 706 transmitted by the relay 608 to the hub 610. In a channel noise floor 710, it is limited by transmitter non-linearity such that the power amplifier of the transmitter limits a signal to noise ratio (SNR) of weak signals coming from far-out subscribers. Accordingly, the far-out subscriber's SNR may be degraded by the power-amplifiers non-linearities.

For signals 702, 704 received from mobile terminals 602, 604, respectively, over the air, power at which the macro relay 608 receives the desired signal will fluctuate depending how far the mobile terminals 602, 604 are from the relay. However, the gain of the transceiver of the relay 608 is fairly fixed, and thus one does not want to retransmit the signal at too low a power otherwise the signal will not have sufficient power to get to the hub 610, or one does not want to so much gain that a strong signal into the receiver will actually get amplified so much that the transmitters of the relay 608 are saturated. Since the relay 608 processes the envelope, one cannot easily provide different gains for a close-in subscriber and far-out subscriber. As such, the close-in subscriber will use a majority of the power amplifier power as compared to the far-out subscriber. Accordingly, performance of a closed loop power control is used to minimize a signal strength spread as well as linearity of the power amplifier. Thus, an adaptive gain function is provided in the relay 608 to that allow proper gain to be applied to the signals 702, 704 so that the relay 608 can transmit at a power that is fairly close to maximum power rating of the transmitter. As such, the signal 706 from the relay 608 to the hub 610 will have a clean and strong signal to noise ratio.

In one embodiment, the signal going to the transmitter of the relay 608 is within about 10 dB of a maximum power rating of the transmitter. However, the strength of the signal coming into the receiver of the relay 608 will vary depending on how close the subscriber is. Thus, the gain needs to be adaptive depending on the strength of the received signal coming in. Additionally, the gain should not be so fast that it disrupts a main power algorithm between the hub 610 and the mobile terminal 602, 604. Accordingly, an overall power control algorithm is provided in which the adaptive gain function control loop (between the relay 608 and the mobile terminal 602, 604) is embedded within the main power control loop (between the hub and the terminal) of which the signal actually goes through. The overall power control algorithm comprises two nested power control loops. In other words, there is going to be a macroscopic power control algorithm between the hub 610 and the mobile terminal 602, 604, and within the relay node 608 itself there is the adaptive power control algorithm to ensure that the signal coming in to the relay 608 does not get over amplified and overdrive the power amplifier, or in some cases under amplified and coming out too weak to reach the hub 610. According, the algorithm needs to be adaptive but not so fast that it causes the main power control algorithm to become unstable since you have two nested power control loops.

Generally, for deploying a wireless cell site, three basic features are needed: (1) power (2) elevation (antennas at top of tower, or building, or large pole, etc.) and (3) a backhaul connection (e.g., modem to the core network) that has enough capacity to service the cell site. Most of the time it is easier to find power and elevation than it is to find a backhaul connection when deploying the network. Accordingly, the remote control model functioning as a macro-relay node does no require the wired backhaul connection because the backhaul is to a macro-cell (BS) over the air. Another benefit is when operators discover that they have holes in their network for various reasons, such as improper planning, the operators can quickly and easily fill those holes by deploying the remote radio module as macro-relays as described above in various embodiments.

It has been determined that for low subscriber density such as ten (10) subscribers per square km (e.g., 800 subscribers per cell having a 5 km radius), the macro-relay node is cheaper to operate than traditional ways to deploy a cell site (full blown BS with modem connected to the core network). As the subscriber density increases, because the operator is using some of the spectrum for backhaul, cell splitting may occur sooner in the macro-relay than would with traditional deployment where all the operator's spectrum is used for access and none for backhaul. There is eventually a cross-over point or a logical point where the subscriber density increases (more revenue generated) such that the operator is better off upgrading the macro-relay to be a full blown cell site. Accordingly, it will be likely that the remote radio modules are configured to initially function as relay nodes, and then will be upgraded by connecting to a modem to function as an access point of a full blown BS (standard macro-cell site) at some time in the future.

Yet another benefit is that the remote radio module is fully upgradeable to a standard access point by purchasing a modem that would work with the remote radio module. Thus, operators are not spending a lot of money into a technology or solution that later the will not be able to upgrade. So at any point when there is backhaul available or when the operator desires to increase the capacity of the network, the operator can rollout a wired backhaul to any of these macro-relay nodes where a remote radio module is deployed and install a modem to work with the radio to function as a standard radio connected to a modem which is connected to a wired backhaul. That is, in the downlink, the remote radio module functions as a standard radio where the radio is connected to a modem and the modem generates the data. The radio converts the data from a digital domain to an analog domain, amplifies and filters, and allows it to be transmitted via an antenna to the subscriber. In the uplink, the radio includes a receiver that receives the data from the subscribers, filters it, amplifies it, digitizes it, and passes it along to the modem.

In summary, various embodiments of the present invention include designs of a remote radio head or module with two personalities. The remote radio head may be referred to as a macro-relay. The first personality of the macro-relay is to act as a standard remote radio head. In this mode the remote radio head or macro-relay is interfaced with a modem and acts as a standard wireless access point which is well known to the wireless industry. In the second personality, the macro-relay is capable of operating as stand alone device, without a modem or backhaul connection, and acts as a relay node where it receives a backhaul signal over the air from a central hub, processes the signal, and then retransmits the signal to wireless users/subscribers in proximity to the macro-relay node. One of the key features which make this concept attractive is that there is no investment risk for an operator because the macro-relay can be easily and seamlessly upgraded to a standard wireless access point by coupling the unit with a modem and providing a backhaul connection at any point in the future. A likely upgrade strategy would be to invest in the modem and backhaul connection once the macro-relay nodes are operating near full capacity such that the spectrum which was dedicated to providing backhaul can be used to provide access and hence more capacity.

Deployments using the various embodiments of the present invention in a hub and spoke configuration will provide a significant reduction in the cost of providing coverage to a given geographic area. Furthermore, as the revenue of a cell site increases and more capacity in needed, the macro-relay can be easily and seamlessly upgraded to a standard 4G access point which makes the operators decision to leverage the Macro-Relay for day one coverage, a very low risk high gain proposal. Furthermore, rather than optimize a solution to increase network capacity, the macro relay is optimized for low capacity, low cost coverage, for the initial 4G role out, since this will be a key concern for operators in the coming years. Given that one is initially trading capacity for lower cost coverage, if the macro-relay is to appeal to operators it is critical that it can be easily and completely upgraded to a full 4G BTS or Relay Node if and when the operator wishes to get back the capacity that was given up in order to minimize up front operational expenses. Given that a 4G BTS typically consists of one or more radio modules with a modem, the most elegant solution is to develop a radio personality which allows the radio module to be deployed as a stand alone relay node if desired. When operating as a relay node, a set of transceivers is employed to provide access, while another set is used to provide a backhaul connection to a central hub. Furthermore, if large numbers of macro-relays are to be deployed in a network, it is imperative that a proprietary OA&M solution be extended to these nodes. To achieve a standard agnostic method of providing an over the air OA&M link between the hub and relay node is disclosed. On approach that can accomplished this is by adding a narrow band proprietary communication channel in the transition band of the carrier.

Accordingly, the exemplary embodiments disclosed herein provide a cost-effective, flexible, and efficient remote radio module that allows operators to role out new cell sites for a network, such as a 4G network, with minimal business risks and operating costs. Exemplary embodiments of the remote radio module have two personalities or modes of operation that can implemented using one radio platform (e.g., same hardware configuration). In one mode, the remote radio module functions as a macro-relay node for extending coverage of a macro-cell site. The macro-relay node wirelessly receives a signal either from a BS or a mobile terminal at a first carrier frequency, and retransmits the same signal, filtered and delayed, either to the mobile terminal or the BS at a second carrier frequency different from the first carrier frequency. Accordingly, the remote radio module provides a very low cost greenfield coverage from day one, and thus reduces the business risk of an initial rollout of a network when there is a low subscriber base. Further, in the other mode, the remote radio module can be easily upgraded to an access point with a full blown BS of a macro-cell that can provide greater capacity when the number of subscribers increases in the future.

While the preceding description shows and describes one or more embodiments, it will be understood by those skilled in the art that various changes, substitutions, and alterations in form and detail may be made therein for carrying out similar purposes and/or achieving similar advantages of the embodiments disclosed herein. Those skilled in the art should also realize that such equivalent constructions do not depart form the spirit and scope of the present disclosure. For example, it is within the scope of the present disclosure that the hub node, core network, relay node and/or user equipment may not exist in the same fashion in other wireless technologies or implementations, but the same functionality may be achieved using other components. In addition, the various steps in the described methods may be performed in a different order than that described, may be modified, and/or may be combined or further separated. Therefore, the claims should be interpreted in a broad manner, consistent with the present disclosure.

What is claimed is:

1. A wireless communication system, comprising:
a hub coupled to a core network; and
a plurality of remote radio modules, each remote radio module including:
a first transceiver operable to wirelessly communicate with a mobile terminal;
a second transceiver operable to wirelessly communicate with the hub; and
a processor for executing instructions stored in memory, the instructions including instructions for:
receiving a signal from the hub at a first carrier frequency; and
processing the signal so that the signal can be retransmitted to the mobile device at a second carrier frequency different from the first carrier frequency;
wherein the hub and the plurality of remote radio modules combine to form a cluster, the cluster including six remote radio modules surrounding the hub, wherein the cluster implements an n=3 frequency plan, wherein the hub provides a wireless access connection to other mobile terminals at frequency1, wherein one of the remote radio modules provides a wireless backhaul connection to the hub at frequency2 and provides a wireless access connection to the mobile terminal at frequency3; and wherein another remote radio module adjacent to the one of the remote radio module provides a wireless backhaul connection to the hub at frequency3 and provides a wireless access connection to the mobile terminal at frequency2.

2. The system of claim 1, wherein the hub includes a base station (BS) of a macro-cell, the BS being coupled to the core network via a wired backhaul connection using a modem.

3. The system of claim 1, wherein the hub and one of the remote radio modules use a proprietary Operational, Alarm, and Monitor (OA&M) control channel, the OA&M channel including one of:
a dedicated tone or a narrow band carrier in a transition band of the first carrier frequency; and
a reserved tone or a set of tones of the first carrier frequency, the reserved tone being reserved for non-traffic data as specified by a wireless communication standard.

4. The system of claim 1, wherein the wireless communication system includes a wireless network supporting one of a WiMAX standard and a Long Term Evolution (LTE) standard.

5. A method, comprising:
receiving a signal from a hub at a first carrier frequency, wherein the hub communicates with a plurality of remote radio modules, each of the plurality of remote radio modules having a first transceiver operable to wirelessly communicate with a mobile terminal, and a second transceiver operable to wirelessly communicate with the hub; and
processing the signal so that the signal can be retransmitted to the mobile device at a second carrier frequency different from the first carrier frequency;
wherein the hub and the plurality of remote radio modules combine to form a cluster, the cluster including six remote radio modules surrounding the hub, wherein the cluster implements an n=3 frequency plan, wherein the hub provides a wireless access connection to other mobile terminals at frequency1, wherein one of the remote radio modules provides a wireless backhaul connection to the hub at frequency2 and provides a wireless access connection to the mobile terminal at frequency3; and wherein another remote radio module adjacent to the one of the remote radio module provides a wireless backhaul connection to the hub at frequency3 and provides a wireless access connection to the mobile terminal at frequency2.

6. A apparatus, comprising:
a plurality of remote radio modules, each remote radio module including:
a first transceiver operable to wirelessly communicate with a mobile terminal;
a second transceiver operable to wirelessly communicate with a hub; and
a processor for executing instructions stored in memory, the instructions including instructions for:
receiving a signal from the hub at a first carrier frequency; and
processing the signal so that the signal can be retransmitted to the mobile device
at a second carrier frequency different from the first carrier frequency;
wherein the hub and the plurality of remote radio modules combine to form a cluster, the cluster including six remote radio modules surrounding the hub, wherein the cluster implements an n=3 frequency plan, wherein the hub provides a wireless access connection to other mobile terminals at frequency1, wherein one of the remote radio modules provides a wireless backhaul connection to the hub at frequency2 and provides a wireless access connection to the mobile terminal at frequency3; and wherein another remote radio module adjacent to the one of the remote radio module provides a wireless backhaul connection to the hub at frequency3 and provides a wireless access connection to the mobile terminal at frequency2.

* * * * *